(12) United States Patent
Feng et al.

(10) Patent No.: US 10,445,689 B2
(45) Date of Patent: Oct. 15, 2019

(54) SYSTEM AND METHOD FOR FORECASTING USING MONTE CARLO METHODS

(71) Applicant: Wal-Mart Stores, Inc., Bentonville, AR (US)

(72) Inventors: Huijun Feng, San Francisco, CA (US); Shubhankar Ray, Union City, CA (US)

(73) Assignee: WALMART APOLLO, LLC, Bentonville, AR (US)

(*) Notice: Subject to any disclaimer, the term of this patent is extended or adjusted under 35 U.S.C. 154(b) by 809 days.

(21) Appl. No.: 14/638,155

(22) Filed: Mar. 4, 2015

(65) Prior Publication Data
US 2016/0260109 A1 Sep. 8, 2016

(51) Int. Cl.
*G06Q 10/00* (2012.01)
*G06Q 10/08* (2012.01)
*G06Q 30/02* (2012.01)
*G06Q 10/06* (2012.01)

(52) U.S. Cl.
CPC ..... *G06Q 10/087* (2013.01); *G06Q 10/06315* (2013.01); *G06Q 30/0201* (2013.01); *G06Q 30/0202* (2013.01); *Y04S 10/54* (2013.01)

(58) Field of Classification Search
None
See application file for complete search history.

(56) References Cited

U.S. PATENT DOCUMENTS

| | | | | |
|---|---|---|---|---|
| 6,151,582 A * | 11/2000 | Huang | G06Q 10/06 | 705/7.25 |
| 7,668,761 B2 * | 2/2010 | Jenkins | G06Q 10/087 | 705/28 |
| 8,666,848 B1 * | 3/2014 | Polsky | G06Q 10/08 | 705/28 |
| 2002/0188499 A1 * | 12/2002 | Jenkins | G06Q 10/06 | 705/3 |
| 2003/0126103 A1 * | 7/2003 | Chen | G06Q 10/06 | 706/50 |
| 2004/0148217 A1 * | 7/2004 | Lauring | G06Q 10/06314 | 705/7.24 |
| 2007/0016496 A1 * | 1/2007 | Bar | G06Q 10/087 | 705/28 |
| 2008/0140688 A1 * | 6/2008 | Clayton | G06Q 10/06 | |
| 2008/0153449 A1 * | 6/2008 | Prasad | H04L 25/0204 | 455/334 |
| 2011/0258049 A1 * | 10/2011 | Ramer | G06F 17/30867 | 705/14.66 |

* cited by examiner

*Primary Examiner* — Gurkanwaljit Singh
(74) *Attorney, Agent, or Firm* — Bryan Cave Leighton Paisner LLP

(57) ABSTRACT

A system and method for calculating demand forecasts is presented. Sales data for a set of SKUs is received. The sales data is filtered to contain only data for low-selling SKUs. A set of clusters of SKUs is created. A generalized dynamic linear model for use with each cluster in the set of clusters is generated. A set of random data points is generated. The dynamic linear model is fitted at each data point in the set of random data points using a Monte Carlo method. This fitting can be performed using an unscented Kalman filter method. Calculating a forecast for sales based on the fitting at each data point. Using the forecast for sales, inventory is ordered. Other embodiments are also disclosed herein.

20 Claims, 5 Drawing Sheets

SYSTEM AND METHOD FOR FORECASTING USING MONTE CARLO METHODS

TECHNICAL FIELD

This disclosure relates generally to forecasting, and relates more particularly to forecasting sales for a retail business.

BACKGROUND

A retail business typically needs to stock items in a warehouse or store in order to sell the items. Storing too few of a particular item can be undesirable because if the item is sold out, then the retail business is not able to sell the item until it is in stock again. Storing too many of a particular item also can be undesirable because the amount of space in a warehouse or store is finite—storing too many of an item that does not sell takes away space from items that do sell. Therefore, it would be desirable to have a system that can more accurately forecast the sales of items for a retailer or distributor.

BRIEF DESCRIPTION OF THE DRAWINGS

To facilitate further description of the embodiments, the following drawings are provided in which.

Figure 1:
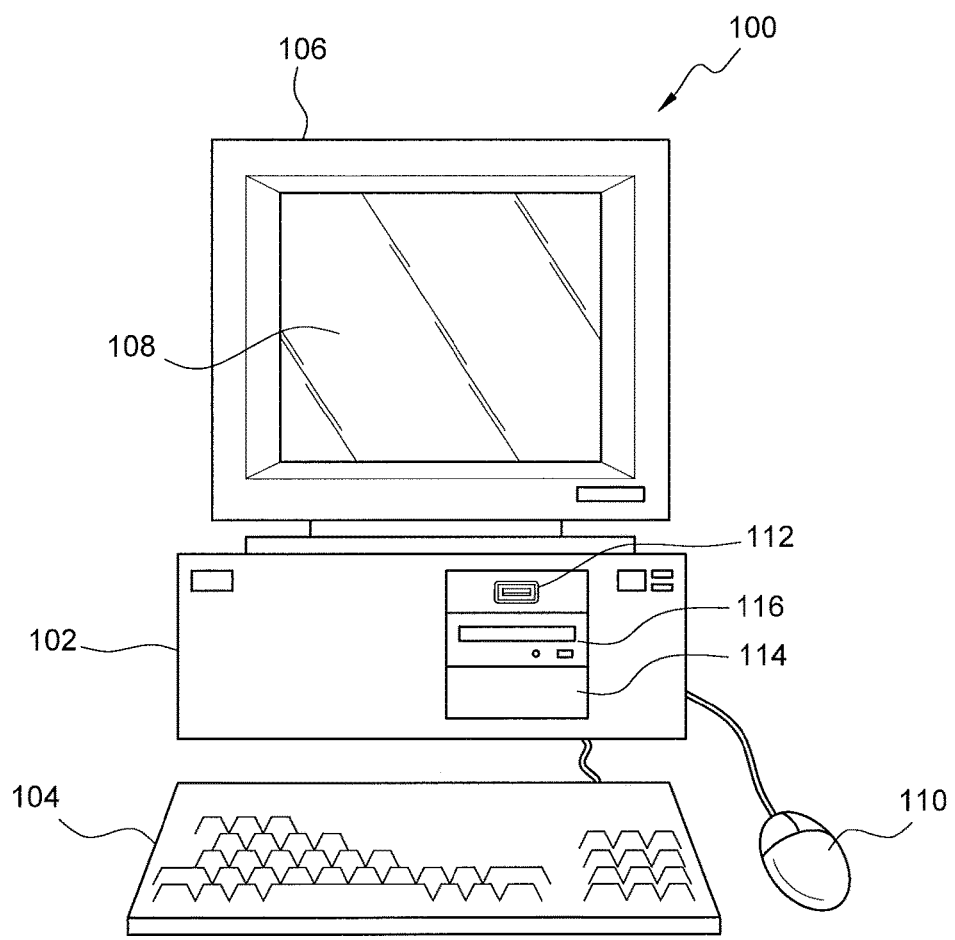
FIG. 1 illustrates a front elevation view of a computer system that is suitable for implementing an embodiment of the system.

For simplicity and clarity of illustration, the drawing figures illustrate the general manner of construction, and descriptions and details of well-known features and techniques might be omitted to avoid unnecessarily obscuring the present disclosure. Additionally, elements in the drawing figures are not necessarily drawn to scale. For example, the dimensions of some of the elements in the figures might be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but might include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements can be electrically coupled together, but not be mechanically or otherwise coupled together. Coupling can be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

In one embodiment, a method can comprise: receiving sales data for a set of stock keeping units (SKUs); filtering the sales data to contain only data for low-selling SKUs, within the set of SKUs that have sales within a bottom twenty percent of the set of SKUs; creating a set of clusters of SKUs from the set of SKUs; generating a dynamic linear model for use with each cluster in the set of clusters; generating a set of random data points; fitting the dynamic linear model at each data point in the set of random data points using a Monte Carlo method; calculating a forecast for sales of the low-selling SKUs based on the fitting at each data point in the set of random data points; and ordering inventory based on the forecast for sales of the low-selling SKUs.

In one embodiment, a system can comprise: a user input device; a display device; one or more processing modules; and one or more non-transitory storage modules storing computing instructions configured to run on the one or more processing modules and perform the acts of receiving sales data for a set of stock keeping units (SKUs); filtering the sales data to contain only data for low-selling SKUs, within the set of SKUs that have sales within a bottom twenty percent of the set of SKUs; creating a set of clusters of SKUs from the set of SKUs; generating a dynamic linear model for use with each cluster in the set of clusters; generating a set of random data points; fitting the dynamic linear model at each data point in the set of random data points using a Monte Carlo method; calculating a forecast for sales of the low-selling SKUs based on the fitting at each data point in the set of random data points; and ordering inventory based on the forecast for sales of the low-selling SKUs.

In one embodiment, at least one or more non-transitory storage modules having computing instructions stored thereon configured perform the acts of: receiving sales data for a set of stock keeping units (SKUs); filtering the sales data to contain only data for low-selling SKUs, within the set of SKUs that have sales within a bottom twenty percent of the set of SKUs; creating a set of clusters of SKUs from the set of SKUs; generating a dynamic linear model for use with each cluster in the set of clusters; generating a set of random data points; fitting the dynamic linear model at each data point in the set of random data points using a Monte Carlo method; calculating a forecast for sales of the low-selling SKUs based on the fitting at each data point in the set of random data points; and ordering inventory based on the forecast for sales of the low-selling SKUs.

Figure 2:
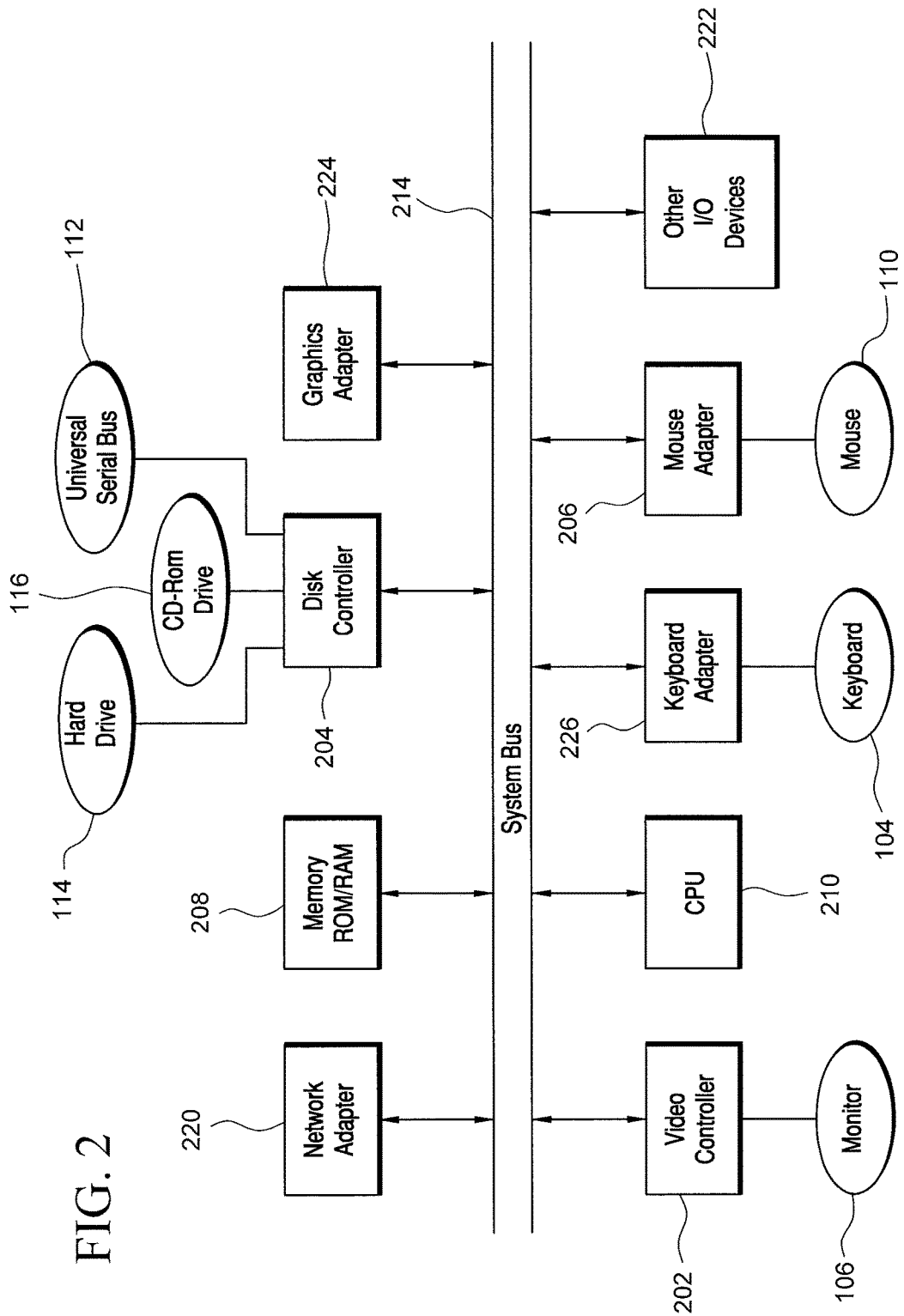
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a refreshing monitor 106, a keyboard 104, and/or a mouse 110, etc.) can also be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module (s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114

(FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smart phone. In certain additional embodiments, computer system 100 may comprise an embedded system.

Forecasting is a key problem encountered in inventory planning for retailers and distributors. In order to buy inventory in advance, retailers or distributors would like an estimate of the number of units a distinct item for sale (also known as a stock keeping unit or a "SKU") is going to sell in a certain time period. To clarify the difference between an item and a SKU, an item might be, for example, an iPad. But each specific configuration of the iPad (screen size, memory size, color, radio, and the like) is a different SKU. Each SKU typically has a unique identifier. Buying fewer quantities of a SKU than is needed leads to lost sales opportunities, hence lower revenue, because items that could have been sold were not in stock. Buying too many of a particular SKU units also can lead to lost sales opportunities because the cost of buying the unused inventory might not be compensated for by income from other sales to customers and can lead to lost opportunity costs (e.g., items that do not sell occupying space in a warehouse or store in place of items that could have been sold).

In general, a retailer or distributor wants to forecast the number of units it will sell so it can accurately purchase the units on a timely basis. One method of forecasting examines past sales of an item. Past sales can reveal both local level and seasonal patterns. Local level patterns refers to sales in the recent past, as sales of a certain SKU in the recent past can be important in forecasting future sales. Seasonality refers to periodic events that can influence sales. Seasonality can refer both to general seasonality (e.g., sales might be higher during the autumn because of the holiday season), and to product seasonality (e.g., some products are generally used only during certain times of the year.) For example, swimwear might be more popular in the summer, while Christmas decorations are more popular in the fall and winter.

Figure 4A:
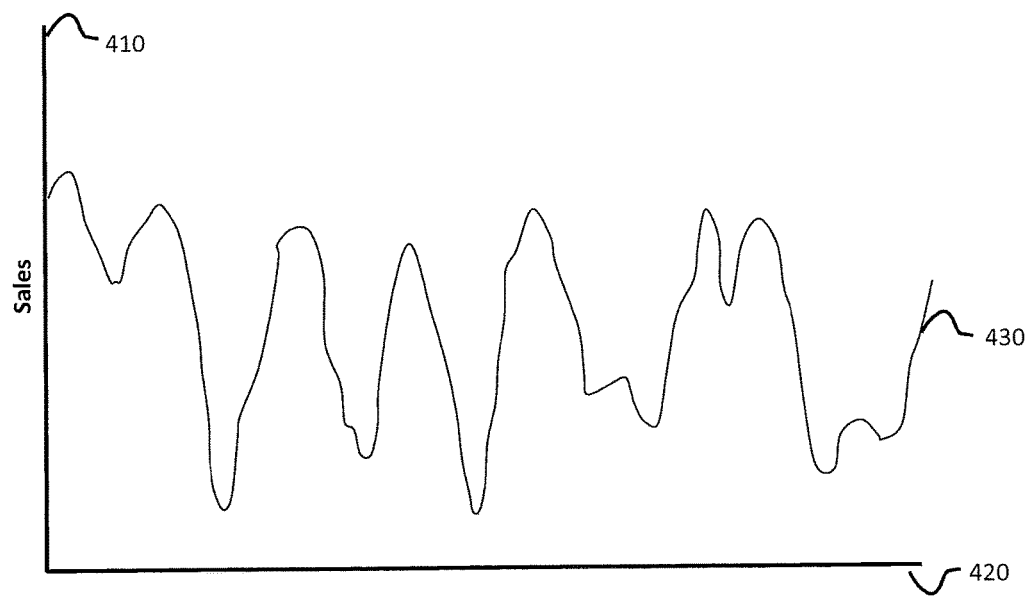
FIGS. 4A-4B illustrate an exemplary sales graph of a stock keeping unit.

With reference to FIG. 4A, a graph illustrating the sales of an exemplary product is illustrated. X-axis 420 is the time period for the sales. For example, FIG. 4A could be an annual graph, and each time period is weekly sales. In another embodiment, FIG. 4A could be a multi-year graph, and each time period could be monthly sales. Other combinations are also possible.

Y-axis 410 is the range of values for sales. Data series 430 represents the sales for each time period represented by X-axis 420. Y-axis 410 can be in a variety of different formats. In some embodiments, Y-axis 410 can represent actual sales. In some embodiments, Y-axis 410 can represent sales rankings. Using rankings as opposed to actual sales might result in more reliable and accurate data in some embodiments. For modeling purposes, two time-series might be considered similar if they rise and fall in unison. A rank correlation metric such as a Pearson correlation or a Spearman correlation can be used to measure similarity between time-series. For display purposes, Y-axis 410 can be linear or logarithmic.

As described above, a retailer would take data such as that illustrated in FIG. 4A and use the data to predict future sales. If the graph is relatively periodic, the retailer can forecast that more of the sales would occur during a certain time of the year and that fewer sales would occur during other times of the year. A few situations can occur that can make the use of such data to predict future sales difficult for some SKUs. For example, a possible situation can occur with electronic commerce ("eCommerce") retailers. Because eCommerce retailers generally store more SKUs than brick and mortar stores, there might not be enough sales data to model each SKU separately. In addition, eCommerce retailers often stock SKUs that are short-lived or have erratic data. For example, some eCommerce retailers have SKUs that sell out quickly, and there exists a time period where there is no data. In addition, there are SKUs that are short-lived, and thus there might not be available seasonal data from a previous year. Exemplary short-lived SKUs can include clothing (because of fashion trends, some items of clothing are sold only for a single season) and electronics (some forms of electronics, such as cell phone and TVs, are updated regularly, so a particular SKU might not have existed a year ago.)

Figure 4B:
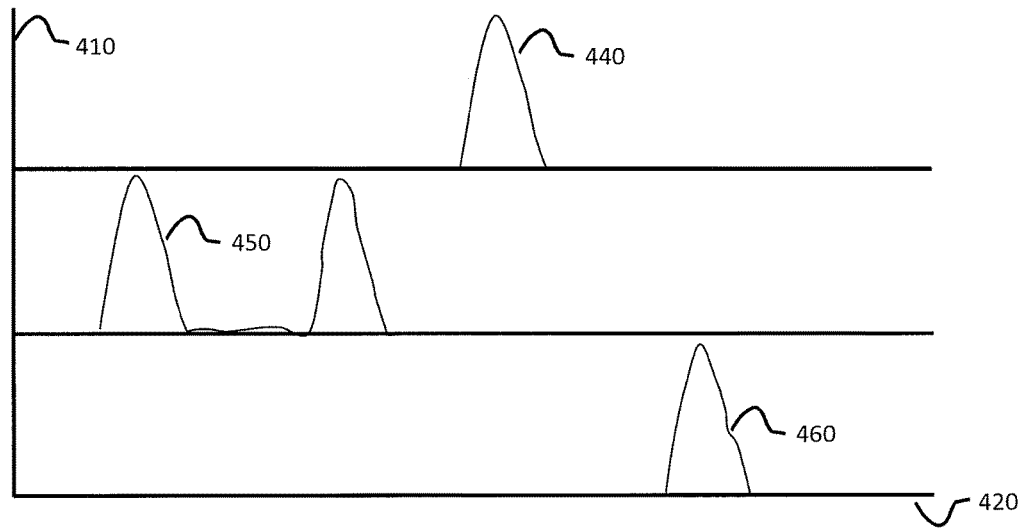

FIG. 4B illustrates three different SKUs that have such situations. The same X-axis 420 and Y-axis 410 that are present in FIG. 4A are also present in FIG. 4B. Data series 440, data series 450, and data series 460 represent the sales of three different items. Data series 440 has incomplete data. Sales are present for only a very short time period, with no sales before or after that time period. This type of data series can be indicative of a short-lived item. Because the item had sales only for a very short-period of time, a popular but short-lived item might be indicative of a product that is no longer made. Data series 450 has two sales spikes, with a period of zero or otherwise low sales in between the sales spikes. Such a data series might be indicative of an item that could not keep up with demand (between the two spikes), and is no longer being made. Or such a data series might be indicative of a seasonal item (explaining the sales spikes) that is no longer being made (explaining the lack of data after the second sales spike). Data series 460 is similar to data series 440 in that it has only a single spike. However, while data series 440 is similar to data series 430 in that a peak for data series 430 roughly coincides with a peak of data series 440, data series 460 has a peak that roughly coincides with a trough of data series 430. This fact can indicate both that the item in data series 460 is a short-lived item and that its sales do not correlate well with the item represented by data series 430.

There are several different methods that can be used to generate sales forecasts for SKUs. Some methods involve placing a SKU in a cluster of SKUs and generating a forecast for the cluster of SKUs.

Many methods of generating a sales forecast assume that the distribution of demand has a Gaussian distribution. For example, several of the methods referenced above use one or more dynamic linear models that are fitted using a Kalman filter.

The Kalman filter is optimized for Gaussian distributions and might not work very well for low-selling items, which typically have inconsistent demand that are more easily modeled as having a Poisson distribution. A Poisson distribution is a discrete probability distribution that expresses the probability of a given number of events occurring in a fixed interval of time and/or space if these events occur with a known average rate and independently of the time since the last event.

Briefly, a Kalman filter works in a two-step process. In a prediction step, the Kalman filter produces estimates of current state variables along with their uncertainty. Once the outcome of the next measurement is observed, these estimates are updated using a weighted average, with more weight being given to estimates with higher certainty. Because of the algorithm's recursive nature, it can be executed in real-time using only the present input measurements and the previously calculated state and its uncertainty matrix; no additional past information is required.

The basic Kalman filter is limited to a linear assumption. However, low-selling items are often non-linear and are best modeled using a Poisson distribution.

Retail sales often have a "long tail" distribution. That is, a relatively small number of products make up the majority of sales of a retailer. At one exemplary retailer, it has been found that approximately 71% of items, sold have a maximum weekly sales of approximately 5 or less.

There have been methods aimed at using the Kalman filter for non-linear assumptions. For example, the extended Kalman filter uses a linking function to transform the non-linear data into a linear form for Kalman filtering purposes. However, when the models are highly non-linear, the extended Kalman filter can give particularly poor performances. In the extended Kalman filter, the state distribution is approximated by a Gaussian random variable which is then propagated analytically through the linearization of the non-linear system. These approximations can introduce large errors in the true posterior mean and covariance of the transformed random variable, which can lead to sub-optimal performance and possibly divergence of the filter.

In response to those criticisms of the extended Kalman filter, the unscented Kalman filter was developed. The unscented Kalman filter uses a deterministic sampling technique called the unscented transformation that picks a minimal set of sample points (also known as sigma points) around the mean. Typically, the number of sigma points is 2L+1, where L is the dimension of the augmented state. These sigma points are then propagated through the non-linear functions, from which the mean and covariance of the estimate then can be recovered. The result is a filter which captures the true mean and covariance of the data more accurately than the extended Kalman filter.

However, it has still been found that the unscented Kalman filter still can be inaccurate for Poisson distribution models of high-dimensions. In other words, analyzing the data for many different SKUs at once is not very accurate for the unscented Kalman filter.

An embodiment solves the above problems by using Monte Carlo methods with the unscented Kalman filter to produce more accurate estimations. Monte Carlo methods rely on repeated random sampling to obtain numerical results. In some embodiments, instead of using 2L+1 sigma points calculated in a specific manner, one performs an unscented Kalman filter using many randomly chosen points around a mean and covariance.

Figure 3:
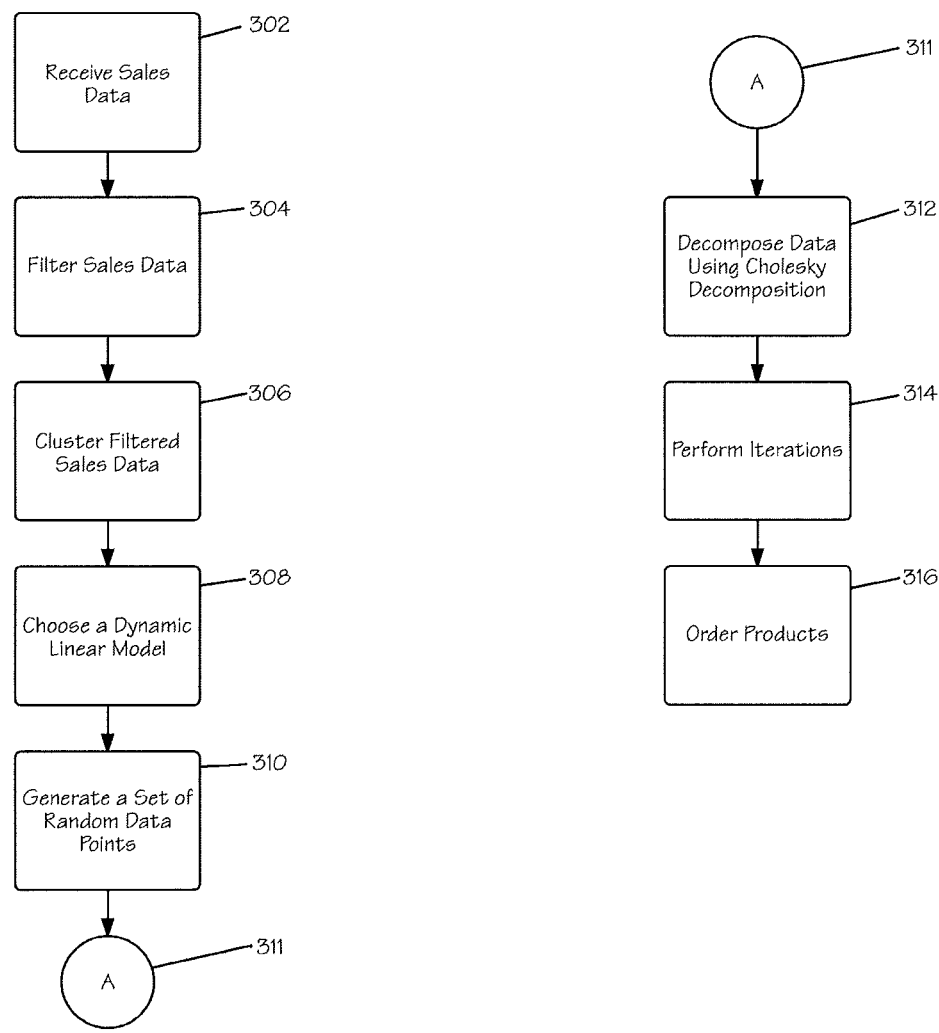
FIG. 3 is a flowchart illustrating the operation of a method for producing a sales forecast.

A flowchart illustrating the operation of a method 300 of using Monte Carlo methods to produce a forecast is presented in FIG. 3. Method 300 is merely exemplary and is not limited to the embodiments presented herein. Method 300 can be employed in many different embodiments or examples not specifically depicted or described herein. In some embodiments, the procedures, the processes and/or the activities of method 500 can be performed in the order presented. In other embodiments, the procedures, the processes, and/or the activities of method 300 can be performed in any other suitable order. In still other embodiments, one or more of the procedures, the processes, and/or the activities of method 300 can be combined or skipped. In some embodiments, method 300 can be implemented by computer system 100 (FIG. 1).

Sales data regarding a set of SKUs is received (block 302). The sales data is filtered to produce data only for "low-selling" SKUs, for processing by an embodiment (block 304). As stated above, the methods presented below are optimized for low-selling items. High-selling items often are linear, and accurate forecasts can be produced using other methods. In some embodiments, "low-selling" SKUs are those where the maximum weekly sales of the SKU are below a certain threshold. This threshold can be five items in some embodiments. The threshold also can be other higher or lower values. The threshold also can be determined as a percentile score. In some embodiments, SKUs that are in the bottom 20 percentile of sales could be considered "low-selling." In other embodiments, lower or higher percentiles can be used, such as bottom 50%, bottom 40%, bottom 30%, bottom 15%, bottom 10%, bottom 5%, or bottom 1%.

Thereafter, the data can be grouped or clustered (block 306). As describe above, there can be a large number of SKUs that are low-sellers. For very large retailers, the number can be in the millions. To simplify calculations, SKUs are grouped in one of a variety of different manners. Exemplary grouping manners can use the categories to which a SKU belongs. In some embodiments, the groups (or clusters) contain between 50 and 300 SKUs.

A dynamic linear model (DLM) is chosen (block 308). This DLM can be a generalized DLM, chosen such that it works well for a large variety of different types of goods. Other methods of forecasting use DLMs specifically chosen for a type of good, or use many different DLMs with different weights, in an attempt to obtain an accurate result. Embodiments can use a generalized DLM tuned for accuracy across a large number of goods.

The data for the cluster is fitted to the DLM using Monte Carlo methodology with an unscented Kalman filter. In general, the Monte Carlo methodology involves sampling the DLM at a large number of random data points. In some embodiments, the number of random data points used can be over 1000. The large number of data points allows more accurate values to be obtained.

To more thoroughly explain this, it can be useful to discuss the details of the unscented Kalman filter in more detail. As described above, the Kalman filter is a recursive estimator that uses an estimated state and a current state to compute an estimate, with no need for a history of observations or estimates. The Kalman filter has two phases, a predict phase and an update phase. The predict phases uses a state estimate from the previous time to product an estimate at the current time. In the update phase, measurement information at the current time is used to refine the prediction to arrive at a new estimate for the current time. These steps are repeated at each time T. The formulas is as follows:

$$x_k = F_k x_{k-1} + B_k u_{k-1} + w_{k-1}$$

Where $F_k$ is the state transition model applied to the previous state $x_{k-1}$; $B_k$ is the control-input model applied to control vector $u_k$; and $w_k$ is the process noise which is assumed to be drawn from a zero mean multivariate normal distribution.

The predicted state is as follows:

$$x_{k|k-1} = F_k \hat{x}_{k-1|k-1} + B_k u_{k-1}$$

The predicted estimated covariance is as follows:

$$P_{k|k-1} = F_k P_{k-1|k-1} F_k^T + Q_{k-1}$$

Where $P_{k|k-1}$ is the covariance at point k given the covariance for point k−1 and $F_k^T$ is the transpose of the F matrix at point k.

The unscented Kalman filter uses a set of sigma points chosen based on the mean. These sigma points are propagated through the non-linear functions and the covariance of the estimate is then recovered. Typically, only a small number of sigma points are chosen, typically 2L+1, where L is the dimensionality of the augmented state. The sample points are chosen around the mean as follows (where $x_a$ is the augmented mean)

$$x_0 = x_a$$

$$x_i = x_0 + (\sqrt{(L+\lambda) P_{k-1|k-1}^a})_i \text{ for } i=1 \ldots L$$

$$x_i = x_0 - (\sqrt{(L+\lambda) P_{k-1|k-1}^a})_i \text{ for } i=L+1, \ldots, 2L$$

Although the unscented Kalman filter is more accurate than previous methods, it has been found to still diverge in certain cases.

Therefore, an embodiment uses Monte Carlo methodology. A set of random points are generated (block 310). The random points are chosen based around the prior mean and covariance. A large number of random points may be chosen. In some embodiments, over 1000 random points are generated.

Calculating expected value and covariance, steps that are part of the Kalman filter method, generally involve integrals. Integrals can be difficult to calculate for non-linear functions, such as those involved in a Poisson distribution. The Monte Carlo method involves evaluating those integrals at each of the random points in the set of random points.

In some embodiments, a Cholesky decomposition is used in conjunction with the Monte Carlo method (block 312). (Connector block 311 is for illustrative purposes and only serves to connect block 310 with block 312.) The Cholesky decomposition involves decomposing a matrix A into a lower triangular matrix as follows:

$$A = LL^*$$

In other words, matrix A is decomposed into a lower triangular matrix L and its conjugate transpose L*. Applying the Cholesky decomposition to a vector of uncorrelated samples, u, produces a sample vector Lu, with the covariance properties of the system being modeled. The Cholesky decomposition can be calculated in a variety of different manners known in the art.

The unscented Kalman filter can be calculated at each of the random points instead of the sigma points. Once the DLM has been calculated at the random samples points for a time T, the process can be repeated again for the next time period T+1 (block 314). After each iteration, the DLM can generate a forecast for sales, which is then used to order goods for a retailer/distributor (block 316).

Figure 5:
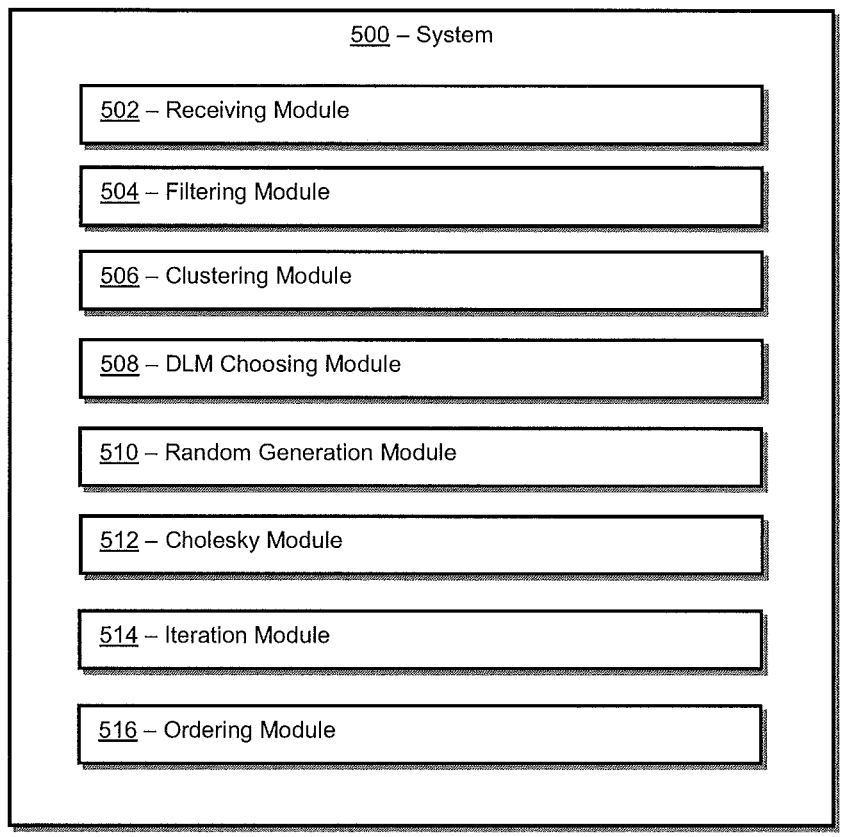
FIG. 5 illustrates a block diagram of a system in accordance with an embodiment of the system.

Turning ahead in the figures, FIG. 5 illustrates a block diagram of a system 500 that is capable of performing disclosed embodiments. System 500 is merely exemplary and is not limited to the embodiments presented herein. System 500 can be employed in many different embodiments or examples not specifically depicted or described herein. In some embodiments, certain elements or modules of system 500 can perform various procedures, processes, and/or acts. In other embodiments, the procedures, processes, and/or acts can be performed by other suitable elements or modules.

In a number of embodiments, system 500 can include receiving module 502. In certain embodiments, receiving module 502 can perform block 302 (FIG. 3) of receiving sales data regarding a set of SKUs.

In a number of embodiments, system 500 can include filtering module 504. In certain embodiments, filtering module 504 can perform block 304 (FIG. 3) of filtering the set of SKUs.

System 500 can include clustering module 506. In certain embodiments, clustering module 506 can perform block 306 (FIG. 3) of clustering the data.

System 500 can include DLM choosing module 508. In certain embodiments, DLM choosing module 508 can perform block 308 (FIG. 3) of choosing a DLM.

System 500 can include random generation module 510. In certain embodiments, random generation module 510 can perform block 310 (FIG. 3) of generating a set of random points.

System 500 can include Cholesky module 512. In certain embodiments, Cholesky module 512 can perform block 312 (FIG. 3) of using a Cholesky decomposition to decompose sales data.

System 500 can include iteration module 514. In certain embodiments, iteration module 514 can perform block 314 (FIG. 3) of performing additional iterations for a set of time periods to generate a sales forecast.

System 500 can include ordering module 516. In certain embodiments, ordering module 516 can perform block 316 (FIG. 3) of ordering products based on the created forecast.

Although the above embodiments have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 can be modified, and that the foregoing discussion of certain of these embodiments does not necessarily represent a complete description of all possible embodiments. For example, one or more of the procedures, processes, or activities of FIGS. 1-5 can include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method comprising:
receiving, with a computer system using one or more processors, sales data for a set of stock keeping units (SKUs);
filtering, with the computer system, the sales data into a low-selling set of SKUs to contain only data for low-selling SKUs, within the set of SKUs that have sales within a bottom twenty percent of the set of SKUs;
creating, with the computer system, a set of clusters of SKUs from the low-selling set of SKUs;
generating, with the computer system, a dynamic linear model for use with each cluster in the set of clusters;
generating, with the computer system, a set of random data points from the sales data, wherein the set of random data points are chosen based around a prior mean and a covariance of the sales data;
fitting, with the computer system, the sales data for each cluster in the set of clusters to the dynamic linear model at each random data point in the set of random data points using a Monte Carlo method with an unscented Kalman filter, wherein the unscented Kalman filter uses an unscented transformation sampling technique to capture a true mean and the covariance of the sales data;
calculating, with the computer system, the sales of the low-selling SKUs based on the fitting at the each random data point in the set of random data points, wherein the unscented Kalman filter is calculated at the each random data point in the set of random data points for a time period T;
iterating, with the computer system, the calculating based on the unscented Kalman filter calculated at the each random data point in the set of random data points for a time period T+1, wherein after each iteration, generating a first forecast for the sales of the each cluster in the set of clusters for the time period T+1;
performing, with the computer system, additional iterations for the time period T+1 of a set of time periods to generate the first forecast for the sales of the each cluster in the set of clusters;
generating, with the computer system, for the time period T+1 of the set of time periods, a second forecast for the sales of the low-selling SKUs; and
ordering inventory based on the second forecast for the sales of the low-selling SKUs for the time period T+1 of the set of time periods.

2. The method of claim 1 wherein:
the set of random data points are generated based on an expected value of the dynamic linear model.

3. The method of claim 2 wherein:
the set of random data points comprises approximately 1,000 random data points.

4. The method of claim 1 wherein:
fitting the dynamic linear model at the each random data point in the set of random data points using the Monte Carlo method comprises using a Cholesky decomposition of an expected value matrix based on the dynamic linear model.

5. The method of claim 1 further comprising:
repeating generating the first forecast based on a plurality of random data points.

6. The method of claim 1 wherein:
fitting the dynamic linear model at the each random data point in the set of random data points comprises using the unscented Kalman filter to fit the dynamic linear model by calculating a value of an integral at the each random data point in the set of random data points, wherein the unscented Kalman filter uses the unscented transformation sampling technique to capture the true mean and the covariance of the sales data.

7. The method of claim 1 wherein:
fitting the dynamic linear model at the each random data point in the set of random data points comprises using the unscented Kalman filter using the set of random data points in place of a set of sigma points, wherein the unscented Kalman filter uses the unscented transformation sampling technique to capture the true mean and the covariance of the sales data.

8. A system comprising:
a user input device;
a display device;
one or more processors; and
one or more non-transitory storage media storing computing instructions configured to run on the one or more processors and perform:
receiving sales data for a set of stock keeping units (SKUs);
filtering the sales data into a low-selling set of SKUs to contain only data for low-selling SKUs, within the set of SKUs that have sales within a bottom twenty percent of the set of SKUs;
creating a set of clusters of SKUs from the low-selling set of SKUs;
generating a dynamic linear model for use with each cluster in the set of clusters;
generating a set of random data points from the sales data, wherein the set of random data points are chosen based around a prior mean and a covariance of the sales data;
fitting the sales data for each cluster in the set of clusters to the dynamic linear model at each random data point in set of random data points using a Monte Carlo method with an unscented Kalman filter, wherein the unscented Kalman filter uses an unscented transformation sampling technique to capture a true mean and the covariance of the sales data;

calculating the sales of the low-selling SKUs based on the fitting at the each random data point in the set of random data points, wherein the unscented Kalman filter is calculated at the each random data point in the set of random data points for a time period T;

iterating, with the computer system, the calculating based on the unscented Kalman filter calculated at the each random data point in the set of random data points for a time period T+1, wherein after each iteration, generating a first forecast for the sales of the each cluster in the set of clusters for the time period T+1;

performing, with the computer system, additional iterations for the time period T+1 of a set of time periods to generate the first forecast for the sales of the each cluster in the set of clusters;

generating for the time period T+1 of the set of time periods, a second forecast for the sales of the low-selling SKUs; and ordering inventory based on the second forecast for the sales of the low-selling SKUs for the time period T+1 of the set of time periods.

9. The system of claim 8 wherein:
the set of random data points are generated based on an expected value of the dynamic linear model.

10. The system of claim 9 wherein:
the set of random data points comprises approximately 1,000 random data points.

11. The system of claim 8 wherein:
fitting the dynamic linear model at the each random data point in the set of random data points using the Monte Carlo method comprises using a Cholesky decomposition of an expected value matrix based on the dynamic linear model.

12. The system of claim 8 wherein the computing instructions further comprise:
repeating generating the first forecast based on a plurality of random data points.

13. The system of claim 8 wherein:
fitting the dynamic linear model at the each random data point in the set of random data points comprises using the unscented Kalman filter to fit the dynamic linear model by calculating a value of an integral at the each random data point in the set of random data points, wherein the unscented Kalman filter uses the unscented transformation sampling technique to capture the true mean and the covariance of the sales data.

14. The system of claim 8 wherein:
fitting the dynamic linear model at the each random data point in the set of random data points comprises using the unscented Kalman filter using the set of random data points in place of a set of sigma points, wherein the unscented Kalman filter uses the unscented transformation sampling technique to capture the true mean and the covariance of the sales data.

15. At least one non-transitory storage media having computing instructions stored thereon executable to perform:
receiving sales data for a set of stock keeping units (SKUs);
filtering the sales data into a low-selling set of SKUs to contain only data for low-selling SKUs, within the set of SKUs that have sales within a bottom twenty percent of the set of SKUs;

creating a set of clusters of SKUs from the low-selling set of SKUs;

generating a dynamic linear model for use with each cluster in the set of clusters;

generating a set of random data points from the sales data, wherein the set of random data points are chosen based around a prior mean and a covariance of the sales data;

fitting the sales data for each cluster in the set of clusters to the dynamic linear model at each random data point in the set of random data points using a Monte Carlo method with an unscented Kalman filter, wherein the unscented Kalman filter uses an unscented transformation sampling technique to capture a true mean and the covariance of the sales data;

calculating the sales of the low-selling SKUs based on the fitting at the each random data point in the set of random data points, wherein the unscented Kalman filter is calculated at the each random data point in the set of random data points for a time period T;

iterating, with the computer system, the calculating based on the unscented Kalman filter calculated at the each random data point in the set of random data points for a time period T+1, wherein after each iteration, generating a first forecast for the sales of the each cluster in the set of clusters for the time period T+1;

performing, with the computer system, additional iterations for the time period T+1 of a set of time periods to generate the first forecast for the sales of the each cluster in the set of clusters;

generating for the time period T+1 of the set of time periods, a second forecast for the sales of the low-selling SKUs; and ordering inventory based on the second forecast for the sales of the low-selling SKUs for the time period T+1 of the set of time periods.

16. The at least one non-transitory storage media of claim 15 wherein:
the set of random data points are chosen generated based on an expected value the dynamic linear model.

17. The at least one non-transitory storage media of claim 16 wherein:
the set of random data points comprises approximately 1,000 random data points.

18. The at least one non-transitory storage media of claim 15 wherein:
fitting the dynamic linear model at the each random data point in the set of random data points using the Monte Carlo method comprises using a Cholesky decomposition of an expected value matrix based on the dynamic linear model.

19. The at least one non-transitory storage media of claim 15 wherein:
fitting the dynamic linear model at the each random data point in the set of random data points comprises using the unscented Kalman filter to fit the dynamic linear model by calculating a value of an integral at the each random data point in the set of random data points, wherein the unscented Kalman filter uses the unscented transformation sampling technique to capture the true mean and the covariance of the sales data.

20. The at least one non-transitory storage media of claim 15 wherein:
fitting the dynamic linear model at the each random data point in the set of random data points comprises using the unscented Kalman filter using the set of random data points in place of a set of sigma points, wherein the unscented Kalman filter uses the unscented transformation sampling technique to capture the true mean and the covariance of the sales data.

* * * * *